United States Patent Office 2,807,473
Patented Sept. 24, 1957

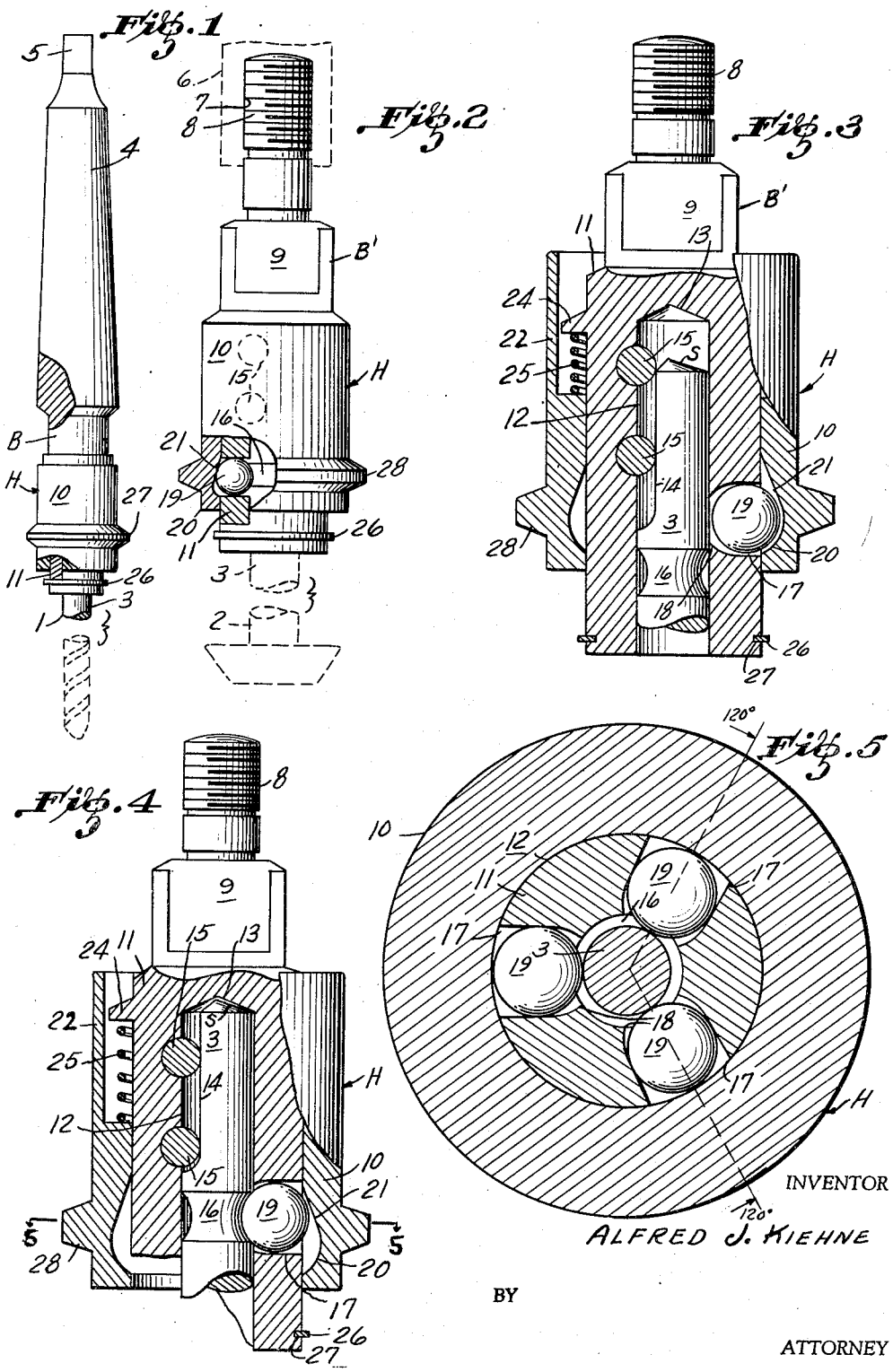

2,807,473

TOOL MOUNTINGS AND RELEASE

Alfred J. Kiehne, Toledo, Ohio

Application February 20, 1956, Serial No. 566,625

4 Claims. (Cl. 279—82)

This invention relates to chucks and shanks for rotary tools and, more particularly, to a quick change chuck for rapidly and positively engaging a tool shank.

In certain machine operations, it is necessary to use several different cutting tools successively in the same chuck. The primary object of this invention is to provide a chuck with provision for initial centering and full-seating of the tool shank in the socket, and which will firmly hold a tool shank in non-rotative relationship with the chuck, positively exert centering forces on the tool at all times, and which nevertheless provides for tool release or engagement by simple axial sliding movement of a retaining sleeve. A further object is to provide a tool shank of special configuration to cooperate with the chuck and provide for extremely accurate work with extremely low tolerance, even though the chuck and shank be made with tolerance of normal machine practice.

These and other objects will be apparent from the following specification and drawing, in which:

Fig. 1 is a side elevation, partly broken away, showing the tool holder as a permanent part of a taper shank mounting and driving element;

Fig. 2 is a side elevation, partly broken away, showing the tool holder with a threaded connection with a driving element;

Fig. 3 is an enlarged, mostly sectional view of the tool holder with a tool shank engaged therein;

Fig. 4 is a view similar to Fig. 3 but showing the tool shank released and partly withdrawn; and, Fig. 5 is a cross-section through the tool holder along the line 5—5 of Fig. 4.

Referring now to the drawings, in which like reference numerals denote similar elements, Figs. 1 and 2 show in dotted lines typical tools, such as a twist drill 1 and abrasive wheel 2, for which the tool holder H is intended. These, as do many other such tools, have a shank 3, normally cylindrical and made with standard shop practice tolerance, generally of the range of 0.002" to 0.004" undersize, but with special adaptation described hereinafter. Tool holder H may be constructed as in Fig. 1, with its base B a permanent part of a taper shank 4 having a conventional terminal tang 5 thereon or, as in Fig. 2, it may have a base B' detachably connected to a driving member by a conventional internally threaded socket 7 and externally threaded neck 8, and provided with wrench facing 9, both forms being merely exemplary of various conventional mountings. For compactness of illustration, the mounting shown in Fig. 2 is illustrated in Figs. 3 and 4, it being understood that tool holder H is identical in all figures. A slip sleeve 10, described in more detail below, is axially slidable on the exterior of socket 11.

Extending forwardly from base B or B' an integral socket 11 has a right-cylindrical inner wall 12 and a conical seat 13 at its inner end. Tool shank 3 is provided at its end with a surface S cooperating with seat 13 to center the shank in socket 11 when the shank is fully inserted therein, tapered seat 13 and surface S being examples of cooperative shank centering surfaces. Shank B is also formed with a flat 14 for engaging with driving dowels 15 set into socket 11 so that non-rotative engagement of the shank in the socket is assured.

Axially spaced from its end surface S, shank 3 is provided with an annular groove 16, and correspondingly spaced from seat 13 at its inner end, socket 11 has three equi-angularly spaced radial ballways 17 therethrough, with lips 18 on their inner ends to prevent complete emergence of steel balls 19 which are radially movable in the ballways. In this example, ballways 17 are spaced 120° apart. Slip sleeve 10 is formed with an annular clearance 20 to permit outward movement of balls 19 to the extent that they clear shank 3, as shown in Fig. 3, and contiguous with the clearance is an annular cam face 21 having its surface at approximately 20° to the axial direction of the socket.

Slip sleeve 10 is cut away on its inner side to provide a skirt 22, and socket 11 has a flange 24 providing an abutment for a compression spring 25 which urges slip sleeve 10 in the direction towards the open end of the socket. To prevent sleeve 10 from sliding too far along socket 11, a split ring 26 seats in an annular groove 27, and an annular flange 28 is formed on the exterior of slip sleeve 10 to provide a hand-hold.

In operation, hand hold 28 is grasped to pull slip sleeve 10 back to the position shown in Fig. 3, thereby placing clearance 20 radially outward of balls 19 so that they may move radially outward in radial guideways 17 to clear shank 3 when the latter is inserted into socket 11. When shank 3 is fully inserted, its end surface S centers in seat 13 at the inner end of the socket and annular groove 16 lies radially inward of balls 19 so that when slip sleeve 10 is manually released, spring 25 drives the slip sleeve axially to its Fig. 4 position, and annular cam face 21 engages balls 19 to force the latter radially inwardly into annular groove 16. The uniform radial converging action of balls 19 as urged by cam face 21 takes up all play or lost motion and positively axially locks the tool shank 3 in centralized power transmitting position.

What is claimed and it is desired to secure by Letters Patent is:

1. A tool holder of the character described comprising a driving spindle having an extension provided with an axial right cylindrical socket, a tool having a shank fitting said socket with normal machine practice tolerance, a centering seat at the inner end of said socket engaged by the inner end of the tool shank, cooperating means in said socket and on said tool shank for holding the latter against turning movement relative to the socket, at least three equidistantly spaced radial ball guide ways in said socket spaced axially from said seat, balls in said guide ways, said tool shank having annular groove for receiving said balls when the end portion of said tool shank is in engagement with said centering seat, a sleeve slidable on the outer side of said extension, an annular cam face on said sleeve engaging said balls thereby to force the same positively in engagement with said annular groove upon axial movement of said sleeve in one direction, said sleeve having outwardly extending annular clearance contiguous to said cam face for receiving portions of the balls to release the tool shank upon axial movement of said sleeve in the opposite direction, and cooperating means on said sleeve and said socket for driving said sleeve in said one direction so as to force said cam face against said balls and drive the latter into said groove for centering the shank and taking up lost motion between the shank and socket.

2. A tool mounting of the character described comprising a driving spindle having an extension provided with an axial socket, a tool having a shank fitting said socket, a seat at the inner end of said socket engaged by the inner end of the tool shank, means carried by said extension and engaging the tool shank for holding the latter from relative turning movements, a plurality of equidistantly spaced radial ball guide ways in said extension spaced axially from said seat, balls in said guide ways, an annular groove in said tool shank for receiving said balls when the end portion of said tool shank is in engagement with said seat, said holding means being disposed between said seat and said annular groove, a spring biased sleeve slidable on the outer side of said extension, an annular cam face on said sleeve engageable with said balls thereby yieldingly to force same positively into engagement with said annular groove upon axial movement of said sleeve in one direction, and an outwardly extending annular clearance in said sleeve contiguous to said cam face for receiving portions of the balls to release the tool shank upon axial movement of said sleeve in the opposite direction.

3. A tool mounting of the character described comprising a driving spindle having an extension provided with an axial socket, a tool having a shank fitting said socket, means carried by said extension and engaging the tool shank for holding the latter from relative turning movements, a plurality of equidistantly spaced radial ball guide ways in said extension, balls in said guide ways, an annular groove in said tool shank for receiving said balls, a sleeve slidable on the outer side of said extension, an annular cam face on said sleeve engageable with said balls thereby to force same positively into engagement with said annular groove upon axial movement of said sleeve in one direction, an outwardly extending annular clearance in said sleeve contiguous to said cam face for receiving portions of the balls to release the tool shank upon axial movement of said sleeve in the opposite direction a relieved portion at the inner end of said sleeve on the inside thereof, a coil spring in said relieved portion and encircling said spindle extension, and an abutment for said spring on said extension whereby the spring urges said sleeve in such manner as to cause said cam face to impart radial pressure against the balls for centralizingly gripping the annular groove in the tool shank.

4. A tool mounting of the character described comprising a driving spindle having an extension provided with an axial socket, a tool having a shank fitting said socket, means carried by said extension and engaging the tool shank for holding the latter from relative turning movements, a plurality of equidistantly spaced radial ball guide ways in said extension, balls in said guide ways, an annular groove in said tool shank for receiving said balls, a sleeve slidable on the outer side of said extension, an annular cam face on said sleeve engageable with said balls thereby to force same positively into engagement with said annular groove upon axial movement of said sleeve in one direction, an outwardly extending annular clearance in said sleeve contiguous to said cam face and merging therewith for receiving portions of the balls to release the tool shank upon axial movement of said sleeve in the opposite direction a relieved portion at the inner end of said sleeve on the inside thereof, a coil spring in said relieved portion and encircling said spindle extension, and an abutment for said spring on said extension whereby the spring urges said sleeve in such manner as to cause said cam face to impart a constant radial pressure against the balls for centralizingly gripping the annular groove in the tool shank.

References Cited in the file of this patent

UNITED STATES PATENTS

| | | |
|---|---|---|
| 489,847 | Church | Jan. 10, 1893 |
| 829,153 | Hollm | Aug. 21, 1906 |
| 2,481,945 | Panyard | Sept. 13, 1949 |
| 2,491,605 | Chittenden | Dec. 20, 1949 |